(12) United States Patent
Fujii et al.

(10) Patent No.: US 8,993,478 B2
(45) Date of Patent: Mar. 31, 2015

(54) ACTIVATED CARBON FOR ELECTRIC DOUBLE LAYER CAPACITOR ELECTRODE AND METHOD FOR PRODUCING THE ACTIVATED CARBON

(75) Inventors: Masaki Fujii, Tokyo (JP); Noriyuki Kiuchi, Tokyo (JP); Shinya Taguchi, Tokyo (JP); Keizo Ikai, Tokyo (JP)

(73) Assignee: JX Nippon Oil & Energy Corporation, Chiyoda-ku, Tokyo (JP)

( * ) Notice: Subject to any disclaimer, the term of this patent is extended or adjusted under 35 U.S.C. 154(b) by 307 days.

(21) Appl. No.: 13/518,166

(22) PCT Filed: Dec. 24, 2010

(86) PCT No.: PCT/JP2010/073303
§ 371 (c)(1),
(2), (4) Date: Jun. 21, 2012

(87) PCT Pub. No.: WO2011/081086
PCT Pub. Date: Jul. 7, 2011

(65) Prior Publication Data
US 2012/0275988 A1 Nov. 1, 2012

(30) Foreign Application Priority Data
Dec. 28, 2009 (JP) ................................. 2009-297122

(51) Int. Cl.
*C01B 31/12* (2006.01)
*H01G 9/04* (2006.01)
*H01G 11/34* (2013.01)

(52) U.S. Cl.
CPC ............. *H01G 9/058* (2013.01); *C01B 31/12* (2013.01); *H01G 11/34* (2013.01); *Y02E 60/13* (2013.01); *Y02T 10/7022* (2013.01)
USPC ...................................................... 502/427

(58) Field of Classification Search
CPC ..... C01B 31/08; C01B 31/12; C01P 2004/61; C01P 2004/62
USPC ...................................................... 502/427
See application file for complete search history.

(56) References Cited

U.S. PATENT DOCUMENTS

| 5,956,225 | A | 9/1999 | Okuyama et al. |
| 6,118,650 | A * | 9/2000 | Maeda et al. ................. 361/508 |
| 7,214,646 | B1 | 5/2007 | Fujino et al. |
| 7,799,733 | B2 | 9/2010 | Wagh et al. |
| 8,541,338 | B2 * | 9/2013 | Gadkaree et al. ............. 502/424 |
| 2002/0048144 | A1 | 4/2002 | Sugo et al. |
| 2007/0183958 | A1 | 8/2007 | Fujino et al. |
| 2007/0258189 | A1 | 11/2007 | Tano et al. |
| 2012/0050948 | A1 | 3/2012 | Fujii et al. |

FOREIGN PATENT DOCUMENTS

| JP | 08-119614 A | 5/1996 |
| JP | 2000-138140 A | 5/2000 |
| JP | 2001-302226 A | 10/2001 |
| JP | 2002-015958 A | 1/2002 |
| JP | 2002-104817 A | 4/2002 |
| JP | 2002-134369 A | 5/2002 |
| JP | 2003-206121 A | 7/2003 |
| JP | 2006-059923 A | 3/2006 |

OTHER PUBLICATIONS

Office Action issued Sep. 17, 2013 in U.S. Appl. No. 13/262,741.
Int'l Search Report issued Apr. 5, 2011 in Int'l Application No. PCT/JP2010/073303.
Int'l Search Report issued Jun. 1, 2010 in Int'l Application No. PCT/JP2010/001727.
Shiraishi, "Tansozairyo no Kenkyu Kaihatsu Doukou", CPC Kenkyu-kai, pp. 23-33, (2009).
Office Action issued Dec. 31, 2013 in U.S. Appl. No. 13/262,741.

* cited by examiner

*Primary Examiner* — Stuart Hendrickson
(74) *Attorney, Agent, or Firm* — Panitch Schwarze Belisario & Nadel LLP

(57) ABSTRACT

The present invention provides a method for producing an activated carbon for an electric double layer capacitor, with which the wettability of a carbon material with an alkali activator is improved, thereby improving contact efficiency between the carbon material and the alkali activator and efficiently promoting reaction between the carbon material, which is a starting material and the activator. The method comprises adjusting a carbon material as it is or after having been calcined to produce a carbon powder having an average particle diameter of 0.5 to 15 μm, oxidizing the carbon powder to contain 3 percent by mass or more of oxygen, and activating the oxidized product with an alkali activator.

4 Claims, 1 Drawing Sheet

ACTIVATED CARBON FOR ELECTRIC DOUBLE LAYER CAPACITOR ELECTRODE AND METHOD FOR PRODUCING THE ACTIVATED CARBON

CROSS-REFERENCE TO RELATED APPLICATION

This application is a Section 371 of International Application No. PCT/JP2010/073303, filed Dec. 24, 2010, which was published in the Japanese language on Jul. 7, 2011, under International Publication No. WO 2011/081086 A1, and the disclosure of which is incorporated herein by reference.

TECHNICAL FIELD

The present invention relates to an activated carbon for an electric double layer capacitor electrode and a method for producing such an activated carbon.

BACKGROUND ART

An activated carbon is made from carbon materials such as carbonized coconut shell, petroleum coke or coal coke that is activated to have a porous structure. The activated carbon, which is porous and thus has a large surface area, has been widely used as an absorbent, a catalyst support, and an electrode material for double layer capacitors and lithium secondary batteries. In particular, in order to increase the energy density, i.e., capacitance in an electric double layer capacitor, which may be used in a hybrid car or the like, an activated carbon having fine pores effectively formed thereon, a high crystallinity and a large surface area has been demanded to be used as an electrode material for the capacitor.

For the industrial production of such an activated carbon with effectively formed fine pores that can be used as an electrode material of an electric double layer capacitor, a method for activation has been generally used, in which a carbon material such as petroleum coke and an alkali metal compound such as potassium hydroxide are heated at a temperature of 600 to 1200° C. in an inert gas atmosphere to allow the alkali metal to ingress between and react with the resulting graphite crystal layers (Patent Literature 1). In this type of activation, the alkali metal enters the layered structure wherein condensed polycyclic hydrocarbons are layered, and as the result forms fine pores.

In a method for producing an activated carbon for an electric double layer capacitor electrode by activating a carbon material with an alkali activator, the activator is mixed in an amount of usually 2 to 4 times more by mass ratio of the carbon material. In particular, when the target specific surface area is large ranging from 2000 to 3000 $m^2/g$, the activated carbon is produced to be also increased in "activator/carbon material" ratio. However, since the ratio of the alkali activator accounting for the production cost is large, the ratio of use of the alkali activator is required to be as low as possible.

In the case of mixing a carbon material and an alkali activator, the carbon material is water-shedding and thus poor in wettability with the alkali activator, which is water-soluble. Simple mixture of the activator and the carbon material leads to insufficient contact therebetween and thus a large amount of the activator is not used for the reaction. The resulting product (activated carbon) is, therefore, small in specific surface area.

Methods for strongly bringing the alkali activator into contact with the carbon material are known, wherein they are mechanically mixed with a ball mill or a Henschel mixer and wherein the alkali activator is mixed in a melting state (Patent Literature 2). However, in any of the methods, the use of an activator in an amount of more than the theoretical amount is required to promote the reaction efficiently but causes the cost increase.

CITATION LIST

Patent Literature

Patent Literature 1: Japanese Patent Laid-Open Publication No. 2006-059923
Patent Literature 2: Japanese Patent Laid-Open Publication No. 2002-134369

SUMMARY OF INVENTION

Technical Problem

The inventors of the present invention have carried out various studies and searches on the basis of their idea that an improvement in wettability of a carbon material with an alkali activator can improve the contact efficiency of the carbon material and the activator so that the reaction of the carbon material and the alkali activator can proceed efficiently.

As the results, the present invention has been completed on the basis of the finding that a carbon material is adjusted to have an average particle diameter of 0.5 to 15 μm to produce carbon powder, which is then oxidized to produce an oxidized product containing 3 percent by mass or more of oxygen, which can be significantly improved in wettability with an alkali activator, and the use of the oxidized product can improve the contact efficiency with the alkali activator so that the portion remaining unactivated if the conventional method is used can also be activated and thus makes it possible to produce an activated carbon having a significantly large surface area.

That is, according to the present invention, in the case of producing an activated carbon with a specific surface area, which is the same as that of the conventional one, activation can be carried out with a smaller amount of an activator and an activation reaction proceeds uniformly, resulting in the production of an activated carbon, which is excellent comparing the conventional ones.

Solution to Problem

That is, the present invention relates to a method for producing an activated carbon for an electric double layer capacitor electrode, comprising adjusting a carbon material as it is or after having been calcined to produce a carbon powder having an average particle diameter of 0.5 to 15 μm, oxidizing the carbon powder to contain 3 percent by mass or more of oxygen, and activating the oxidized product with an alkali activator.

The present invention also relates to the foregoing method wherein the carbon material is graphitizable.

The present invention also relates to the foregoing method wherein the calcination temperature is from 500 to 900° C.

The present invention also relates to the foregoing method wherein the mix ratio of the oxidized product and the alkali activator is in the range of the oxidized product: the alkali activator=1:1 to 1:4 (mass ratio).

The present invention also relates to an activated carbon for an electric double layer capacitor electrode producing any of the foregoing methods.

The present invention also relates to an electric double layer capacitor comprising the foregoing activated carbon as an electrode.

Advantageous Effects of Invention

According to the present invention, the reaction of a carbon material and an alkali activator can be expedited efficiently, resulting in a decrease in the amount of the alkali activator to be used than ever and thus in a significant production cost reduction. The method of the present invention can provide an activated carbon that is excellent in uniformity, and the use of the activated carbon for an electrode of an electric double layer capacitor can provide a capacitor with a large capacitance per unit volume.

Figure 1:
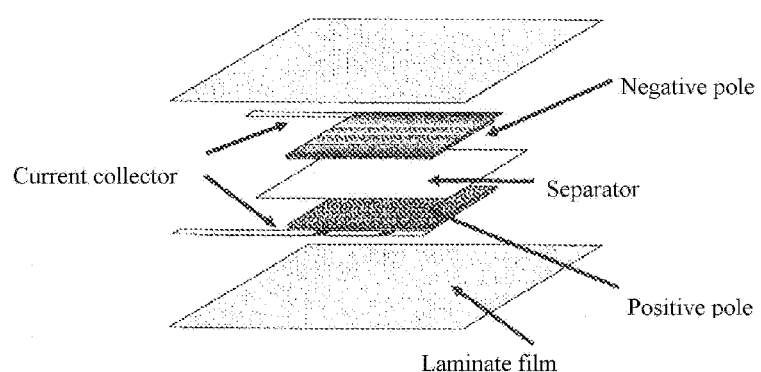
FIG. 1 shows a structure used for evaluating a carbon electrode material.

The present invention will be described in details below.

Carbon materials used as the starting material in the present invention are preferably graphitizable carbon materials. Examples of the graphitizable carbon materials include petroleum coke and coal coke. The graphitizable carbon material may also be mesophase pitch and infusibilized and carbonized mesophase pitch fiber produced by spinning mesophase pitch. Petroleum coke is preferably used.

The petroleum coke is a product containing mainly solid carbon produced by cracking (coking) thermally a heavy fraction of petroleum at a high temperature on the order of 500° C. and is referred to as petroleum coke to be differentiated from ordinary coal-based coke. Petroleum coke may be classified into those produced by delayed coking and those produced by fluid coking. Currently, the former constitutes the majority. In the present invention, petroleum green coke (green coke) remaining as it is taken out from a coker is preferably used. The green coke produced by delayed coking contains 6 to 13 percent by mass of a volatile component while the green coke produced by fluid coking contains 4 to 7 percent by mass of a volatile component. In the present invention, the green coke produced by either one of the methods may be used. However, the green coke produced by delayed coking is particularly suitable in view of easy availability and stable quality.

No particular limitation is imposed on the heavy fraction of petroleum. Examples of the heavy fraction include heavy oil that is a residue produced when petroleums are vacuum-distilled, heavy oil produced by fluid catalytic cracking petroleums, heavy oil produced by hydrodesulfurizing petroleums, and mixtures thereof.

In the present invention, (1) the above-described carbon material is adjusted in particle size and oxidized and then subjected to an activation reaction by being mixed with an alkali activator or (2) the above-described carbon material is adjusted in particle size after calcined, followed by oxidization and then subjected to an activation reaction by being mixed with an alkali activator.

In the case of calcining a carbon material, it is calcined at a temperature of preferably 500 to 900° C., more preferably 500 to 800° C. in an inert gas. No particular limitation is imposed on the temperature increase rate during calcination. However, a too slow rate would lead to a time-consuming treatment while a too rapid temperature increase would cause volatile components to volatilize explosively, possibly resulting in breakage of crystalline structures. The rate is thus preferably from 30 to 600° C./hour, more preferably from 60 to 300° C./hour.

Once an intended carbonization temperature reaches, the temperature is preferably kept for a certain period of time. The period is on the order of for example 10 minutes to 2 hours.

In the present invention, the particle size of a carbon material is necessarily adjusted before oxidizing the carbon material.

The carbon material is adjusted to have an average particle diameter of 0.5 to 15 µm, preferably 1 to 12 µm, more preferably 1 to 8 µm. A particle diameter of the carbon material of smaller than 0.5 µm involves fusion of particles causing an increase in the particle diameter. A particle diameter of the resulting carbon material of larger than 15 µm leads to an activated carbon having a particle diameter larger than the intended diameter.

No particular limitation is imposed on the method of adjusting the particle diameter of the carbon material. However, a method may be used wherein the material is crushed with crushing means such as a jet mill.

Next, the carbon material having been adjusted in particle size is oxidized. Oxidization can improve the wettability of the carbon material with an alkali activator.

Oxidization is necessarily carried out so that the oxygen content of the resulting carbon material is 3 percent by mass or more, preferably 4 percent by mass or more. If the oxygen content of the resulting carbon material is less than 3 percent by mass, it is not preferable because the carbon material can not be improved in wettability with an alkali activator and thus fails to be activated. A too large oxygen content of the resulting carbon material is not also preferable. The upper limit oxygen content is preferably 20 percent by mass or less, more preferably 15 percent by mass or less. If the oxygen content is more than 20 percent by mass, the yield of carbons is largely decreased but an improvement in wettability would not be so significant.

The above-described oxidization is usually carried out by heating the carbon material in the presence of an oxidizing gas or dipping the carbon material in an acid aqueous solution.

In the case of heating the carbon material in the presence of an oxidizing gas, examples thereof include air, oxygen, ozone, nitrogen monoxide, steam, and chlorine. However, preferred are air and oxygen, and particularly preferred is air.

The conditions of oxidization carried out using an oxidizing gas vary depending on the oxidizing power thereof and can be suitably selected depending on the degree of oxidization of the material after being oxidized. However, the oxidization is necessarily carried out so that the oxygen content of the oxidized carbon material falls within the above-described range.

Specifically, when the oxidization is carried out using air as an oxidizing gas, the oxidization temperature is preferably from 220 to 500° C., more preferably 250 to 450° C. If the oxidization temperature is lower than 220° C., the oxidization would proceed insufficiently. If the oxidization temperature is higher than 500° C., the oxidization would proceed too much. No particular limitation is imposed on the oxidization time. However, after the intended temperature reaches, it is preferably kept for 10 minutes to 2 hours.

In the case of oxidizing the carbon material by dipping it in an acid aqueous solution, examples of the acid include nitric acid, sulfuric acid, and acetic acid. Examples of other oxidizing agents include hydrogen peroxide solution. The oxidization conditions vary on the oxidizing power of the acid to be used. For example, in the case of using nitric acid, the carbon material is oxidized in a 10 to 70 percent, preferably 20 to 60 percent aqueous solution at a temperature of 0 to 100° C., preferably 20 to 80° C. for one to 120 minutes, preferably 10 to 60 minutes.

Next, the oxidized carbon material is treated in a mixing step wherein it is mixed with an alkali activator and an activation step wherein the carbon material is activated.

Although needless to mention, any conventional method for mixing the carbon material and an alkali activator, such as a mechanical mixing using a conventional ball mill or a Henschel mixer or a method wherein the carbon material is mixed with an alkali activator having been in a melting state may be obviously applicable, a method wherein an alkali activator aqueous solution and the carbon material is wet-mixed may be also be applicable in the present invention because of the improved wettability of the carbon material. This method makes it possible to activate the carbon materials with a less amount of an alkali activator. That is, the present invention is characterized in that the intended activated carbon can be produced even though the amount of an alkali activator is made less than the usual. The mix ratio of the carbon material and the alkali activator is to be such that the mass ratio of the both (carbon material:alkali activator) is in the range of preferably 1:1 to 1:4, more preferably 1:1 to 1:3, more preferably 1:1.2 to 1:2.5.

Examples of the alkali metal activator used in the activation reaction include KOH, NaOH, RbOH, and CsOH. Particularly preferred is KOH in view of activation efficiency.

No particular limitation is imposed on the activation reaction conditions if the reaction can be carried out sufficiently. The activation may be carried out under the conditions that are similar to those of a conventional activation treatment carried out for the production of a conventional activated carbon. For example, the activation may be carried out by mixing an alkali activator with the carbon material having been oxidized and heating the mixture at an elevated temperature of preferably 400° C. or higher, more preferably 600° C. or higher, more preferably 700° C. or higher. No particular limitation is imposed on the upper limit of the heating temperature if the activation reaction proceeds without any problem. However, 900° C. or lower is preferable.

The activated product resulting from the activation reaction is then washed. The method for washing the activated product is preferably a method wherein the activated product is washed with a washing liquid and the solid and liquid are separated. For example, a method may be employed, wherein the activated product is immersed in a washing liquid and if necessary stirred and heated so as to be mixed therewith, and the washing liquid is removed.

The washing liquid is preferably water or an acid aqueous solution. For example, any combination such as washing with water, washing with an acid aqueous solution, and again washing with water may be used.

Examples of the acid aqueous solution include halogenated hydracids such as hydrochloric acid, hydriodic acid, and hydrobromic acid, and inorganic acids such as sulfuric acid and carbonic acid. The concentration of the acid aqueous solution may be from 0.01 to 3 N. Washing with these washing liquids may be repeated more than once if necessary.

No particular limitation is imposed on the amount of the alkali metal remaining in the washed product if the amount is lower than such a level (preferably 1000 ppm by mass or less) that possibly adversely affects the resulting electric double layer capacitor. However, for example, the activated product is preferably washed so that the pH of the detergent drain is from 7 to 8 and washed so that the alkali metal is removed as much as possible. After washing, the product undergoes a drying step that is conventionally carried out, thereby producing the intended activated carbon.

The activated carbon produced by the present invention has an average particle diameter of 0.5 to 12 μm and a specific surface area of 1500 to 3000 m$^2$/g. Further, the pore volume of the pores with a diameter of 0.1 to 50 nm in the activated carbon, determined by the nitrogen gas adsorption method is from 0.5 to 3 ml/g while the pore volume of the pores with a diameter of 0.05 to 300 μm in the activated carbon, determined by the mercury intrusion method is from 0.4 to 5 ml/g. The remaining alkali metal content is 200 ppm by mass or less.

The use of the activated carbon having the above-described characteristics of the present invention makes it possible to provide an electric double layer capacitor having a large capacitance per unit volume.

Next, description will be given of the electric double layer capacitor of the present invention.

The electric double layer capacitor of the present invention is characterized in that it is provided with electrodes containing an activated carbon prepared as described above.

The electrodes is configured with the activated carbon and a binder and preferably in addition an electric conductive agent and may be electrodes that are integrated with a collector.

The binder used herein may be any conventional one. Examples of the binder include polyolefins such as polyethylene and polypropylene, fluorinated polymers such as polytetrafluoroethylene, polyvinylidene fluoride and fluoroolefin/vinylether cross-linked copolymers, celluloses such as carboxylmethyl cellulose, vinyl polymers such as polyvinylpyrrolidone and polyvinyl alcohol, and polyacrylic acids. No particular limitation is imposed on the content of the binder in the electrode. The content is usually selected within the range of 0.1 to 30 percent by mass on the basis of the total amount of the activated carbon and the binder.

The electric conductive agent may be a powdery material of such as carbon black, powder graphite, titanium oxide and ruthenium oxide. The blend amount of the electric conductive material in the electrode is suitably selected depending on the purposes of blending. The blend amount is usually selected within the range of usually 1 to 50 percent by mass, preferably from 2 to 30 percent by mass on the basis of the total amount of the activated carbon, binder and electric conductive agent.

The activated carbon, binder and electric conductive agent may be mixed by a conventional method. For example, a method may be employed, wherein a solvent that dissolves the binder is added to these components to prepare slurry, which is then applied evenly on a collector or wherein these components are kneaded without adding such a solvent and pressed at ordinary temperature or while being heated.

The collector may be any of those of conventional materials with conventional shapes. Examples of the material include metals such as aluminum, titanium, tantalum, and nickel and alloys such as stainless.

The unit cell of the electric double layer capacitor of the present invention is formed by placing a pair of the above-described electrodes used as positive and negative electrodes to face each other via a separator (polypropylene fiber non-woven fabric, glass fiber fabric or synthetic cellulose paper) and then immersing the electrodes into an electrolytic solution.

The electrolytic solution may be any of aqueous or organic electrolytic solutions known in the art. However, organic electrolytic solutions are preferably used. Examples of such organic electrolytic solutions include those used for electrochemical electrolytic solutions such as propylene carbonate, ethylene carbonate, butylene carbonate, γ-butyrolactone, sulfolane, sulfolane derivatives, 3-methylsulfolane, 1,2-dimethoxyethane, acetonitrile, glutaronitrile, valeronitrile, dimethylformamide, dimethylsulfoxide, tetrahydrofuran, dimethoxyethane, methyl formate, dimethyl carbonate, diethyl carbonate, and ethyl methyl carbonate. Note that these electrolytic solutions may be used in combination.

No particular limitation is imposed on the supporting electrolyte in the organic electrolytic solution. Therefore, the supporting electrolyte may be any of various salts, acids, and alkalis that are generally used in the electrochemical field or the battery field. Examples of such a supporting electrolyte include inorganic ionic salts such as alkali metal salts and alkaline earth metal salts, quaternary ammonium salts, cyclic quaternary ammonium salts, and quaternary phosphonium salts. Preferable examples include $(C_2H_5)_4NBF_4$, $(C_2H_5)_3(CH_3)NBF_4$, $(C_2H_5)_4PBF_4$, $(C_2H_5)_3(CH_3)PBF_4$. The concentrations of such salts in electrolytic solutions are properly selected from the range of usually 0.1 to 5 mol/l, preferably 0.5 to 3 mol/l.

No particular limitation is imposed on the more specific configuration of the electric double layer capacitor. However, example of the configuration include a coin type accommodating a pair of electrodes (positive and negative electrodes) in the form of sheet or disc with a thickness of 10 to 500 μm and a separator sandwiched between the electrodes, in a metal case, a wound type comprising a pair or electrodes and a separator disposed therebetween, all of which are wound, and a layered type comprising electrodes stacked via separators.

EXAMPLES

The present invention will be described in more details with reference to the following examples but is not limited thereto.

Methods carried out for various analysis are as follows.

Oxygen mass %: the carbon mass %, hydrogen mass % and nitrogen mass % of a sample were measured using an element analysis device (NCH-22F, manufactured by Sumika Chemical Analysis Service Ltd.) and the remaining was determined as the oxygen mass %.

Volatile content: measured in accordance with a method described in JIS M8812 "Coal and coke-Method for proximate analysis".

Specific surface area and pore volume: calculated from the adsorption isotherm determined by the nitrogen gas adsorption method, by the BET method using an automatic specific surface area measuring device (BELSOPR-mini II, manufactured by BELL JAPAN INC).

Particle size distribution measurement: measured using a laser diffraction particle size analyzer (LA-950 manufactured by HORIBA, Ltd.) after adding a small amount of surfactant containing water as dispersant and irradiating ultrasonic wave to a sample. From the resulting particle size integral curve on the basis of the volume, 50% particle size (average particle size) was determined.

Example 1

Petroleum green coke with an average particle diameter of 2 mm or smaller was crushed with a jet mill to have an average diameter of 8 μm. The resulting crushed product was heated at a temperature increase rate of 200° C./hour in an air atmosphere and kept at a temperature of 250° C. for one hour to be oxidized. Potassium hydroxide in an amount of 200 parts by mass of 100 parts by mass of the oxidized product was added to and mixed with the oxidized product with a ball mill, followed by activation at a temperature of 750° C. for one hour in a nitrogen gas atmosphere. After the activation reaction, the reaction mixture was repeatedly washed with water and acid (hydrochloric acid was used) to remove the metal potassium remaining the carbon material and dried thereby producing an activated product (an activated carbon for an electric double layer capacitor). The resulting activated product, i.e., (a carbon material for an electrode) was found to have a specific surface area of 2380 $m^2/g$ and a pore volume of 1.129 $cm^3/g$, as determined by the nitrogen gas adsorption method (BET method).

The resulting carbon material for an electrode was mixed with carbon black and granular polytetrafluoroethylene (PTFE) and then pressed thereby producing a carbon electrode sheet with a thickness of on the order of 150 μm to 200 μm. The sheet was cut out to be in a predetermined size and was used to produce a laminated cell shown in FIG. 1 to evaluate the properties as a capacitor. A propylene carbonate solution of 1.5 M of triethylmethylammonium tetrafuloroborate ($TEMA.BF_4$) was used as an electrolyte solution.

Figure 2:
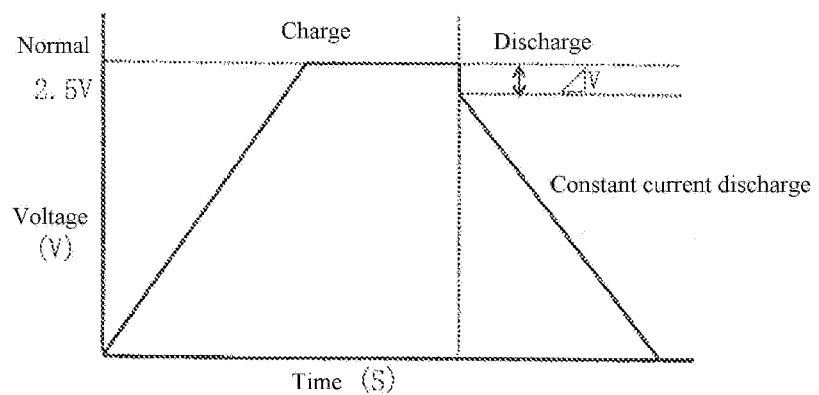
FIG. 2 shows a method for measuring the initial characteristics (capacitance, internal resistance) of a capacitor.

Next, the initial characteristics of the capacitor was measured using the above-produced laminated cell. The method for the measurement is shown in FIG. 2.

Capacitance was determined by measuring the total energy amount stored in the capacitor for calculation (energy conversion method).

Capacitance: $C=2U/Vc^2 Vc=Vm-\Delta V$

U: Total discharge energy (integral value of discharge curve from full charge Vm to 0V)

Vc: Actual voltage obtained by subtracting a voltage drop due to internal resistance from full charged voltage Internal resistance was calculated from IR drop immediately after the initiation of discharge.

Internal resistance: $R(\Omega)=\Delta V/I$ wherein I is a discharge current (A).

The rate factors of the capacitor were determined by measuring the capacitance after the constant current discharge was changed from 0.36 $mA/cm^2$ to 72 $mA/cm^2$. The results of the rate factor were summarized as the maintenance rate of capacitance upon change of the constant current discharge on the basis of the capacitance at a discharge of 0.36 $mA/cm^2$.

The results are set forth in Tables 1 and 2. The activation conditions and results of Examples 2 to 6 and Comparative Examples 1 to 5 are also set forth in Tables 1 and 2.

Example 2

An activated carbon for an electrode was produced with the same procedures of Example 1 except that potassium hydroxide in an amount of 140 parts by mass of 100 parts by mass of the oxidized product produced under the same conditions as those of Example 1 except that the oxidization temperature was 450° C. was dissolved in water and mixed with the oxidized product and then dried at a temperature of 130° C. for 5 hours for activation. The resulting activated product (a carbon material for an electrode) was found to have a specific surface area of 1694 $m^2/g$ and a pore volume of 0.790 $cm^3/g$ as determined by the nitrogen gas adsorption method (BET method).

Example 3

An activated carbon for an electrode was produced with the same procedures as those of Example 1 except that potassium hydroxide in an amount of 160 parts by mass of 100 parts by mass of the oxidized product that is the same as produced in Example 1 was mixed therewith a ball mill. The resulting activated product (a carbon material for an electrode) was found to have a specific surface area of 1608 m²/g and a pore volume of 0.757 cm³/g as determined by the nitrogen gas adsorption method (BET method).

Example 4

The crushed green coke that is the same as used in Example 1 was treated in 10 percent nitrate acid at a temperature of 60° C. for one hour. After being allowed to cool, the treated product was washed by filtration until the pH of the filtrate was 4 or higher and then dried at a temperature of 110° C. for 5 hours. The physical characteristics of the treated product are set forth in Table 1. This treated product was mixed with potassium hydroxide, activated, washed and dried similarly to Example 1 thereby producing an activated carbon. The activated carbon was found to have a specific surface area of 2512 m²/g and a pore volume of 1.202 cm³/g.

Example 5

The raw material green coke that is the same as used in Example 1 was calcined in a nitrogen gas atmosphere at a temperature of 550° C. for one hour. The temperature increase rate during the calcination was 200° C./hour. The resulting calcined product was crushed with a jet mill so as to have an average particle diameter of 7 μm, and the crushed product was oxidized at a temperature of 450° C. for one hour similarly to Example 3. The element analysis values of the oxidized product is set forth in Table 1. Furthermore, the oxidized product was mixed with potassium hydroxide, activated at a temperature of 700° C. for one hour, washed and dried similarly to Example 1 thereby producing an activated carbon. The resulting activated carbon was found to have a specific surface area of 2755 m²/g and a pore volume of 1.323 cm³/g.

Example 6

The oxidized product that is the same as used in Example 5 was mixed with sodium hydroxide, activated at a temperature of 750° C. for one hour, and then washed and dried in the same manner as that in Example 1 thereby producing an activated carbon. The resulting activated carbon was found to have a specific surface area of 1704 m²/g and a pore volume of 0.926 cm³/g.

Comparative Example 1

The raw material green coke that is the same as used in Example 1, which had been crushed with a jet mill (having an average particle diameter of 8 μm) was activated, washed and dried in the same manner as in Example 1 without oxidization thereby producing an activated carbon. The resulting activated carbon was found to have a specific surface area of 2013 m²/g.

Comparative Example 2

The raw material green coke that is the same as used in Example 1, which had been crushed with a jet mill (having an average particle diameter of 8 μm) was activated, washed and dried in the same manner as in Example 2 without oxidization thereby producing an activated carbon. The resulting activated carbon (a carbon material for an electrode) was found to have a specific surface area of 768 m²/g and a pore volume of 0.363 cm³/g, as determined by the nitrogen gas adsorption method (BET method).

Comparative Example 3

An activated carbon for an electrode was produced with the same procedures of Example 3 except that potassium hydroxide in an amount of 70 parts by mass of 100 parts by mass of the oxidized product that is produced in the same manner as that in Example 3 was dissolved in water and mixed with the oxidized product. The resulting activated carbon (a carbon material for an electrode) was found to have a specific surface area of 569 m²/g and a pore volume of 0.267 cm³/g, as determined by the nitrogen gas adsorption method (BET method).

Comparative Example 4

The raw material green coke that is the same as used in Example 1, which had been crushed with a jet mill (having an average particle diameter of 8 μm) was heated at a temperature increase rate of 200° C./hour in an air atmosphere and treated by being kept at a temperature of 200° C. for one hour. The treated product was activated, washed and dried similarly to Example 1 thereby producing an activated carbon. The resulting activated carbon was found to have a specific surface area of 2062 m²/g.

Comparative Example 5

The crushed product that is the same as produced by adjusting the particle size in Example 5 was treated by being heated at a temperature increase rate of 200° C./hour and kept at a temperature of 200° C. for one hour. The treated product was activated, washed, and dried in the same manner as in Example 5 thereby producing an activated carbon. The resulting activated carbon was found to have a specific surface area of 1756 m²/g.

TABLE 1

| | Items | | Example 1 | Example 2 | Example 3 | Example 4 | Example 5 | Example 6 |
|---|---|---|---|---|---|---|---|---|
| Calcination | Calcination Conditions | | none | none | none | none | 550° C. 1 hr | 550° C. 1 hr |
| Paticle Size Adjustment | Average Particle Diameter (μm) | | 8 | 8 | 8 | 8 | 7 | 7 |
| Oxidization | Oxidization conditions | | 250° C. 1 hr air | 450° C. 1 hr air | 250° C. 1 hr air | 10%HNO3 60° C. 1 hr | 450° C. 1 hr air | 450° C. 1 hr air |
| Oxidized Product | Element Analysis (%) | C | 93 | 82.5 | 93 | 89.8 | 83.2 | 83.2 |
| | | H | 3.2 | 2.2 | 3.2 | 2.2 | 2.3 | 2.3 |
| | | N | 0 | 0 | 0 | 1.3 | 0 | 0 |
| | | O | 3.8 | 14.9 | 3.8 | 6.7 | 14.5 | 14.5 |

TABLE 1-continued

| | | | | | | | |
|---|---|---|---|---|---|---|---|
| Mixing | Activator | KOH | KOH | KOH | KOH | KOH | NaOH |
| | Activator/Carbon Material Mix Ratio (g/g) | 2 | 1.4 | 1.6 | 2 | 2 | 2 |
| | Activation Temperature (° C.) | 750 | 750 | 750 | 750 | 700 | 750 |
| Activated Carbon | Specific Surfacer Area (m²/g) | 2380 | 1694 | 1608 | 2512 | 2755 | 1704 |
| | Pore Volume (cm³/g) | 1.129 | 0.79 | 0.757 | 1.202 | 1.323 | 0.926 |

| | Items | | Comparative Example 1 | Comparative Example 2 | Comparative Example 3 | Comparative Example 4 | Comparative Example 5 |
|---|---|---|---|---|---|---|---|
| Calcination | Calcination Conditions | | none | none | none | none | 550° C. 1 hr |
| Paticle Size Adjustment | Average Particle Diameter (μm) | | 8 | 8 | 8 | 8 | 7 |
| Oxidization | Oxidization conditions | | none | none | 450° C. 1 hr air | 200° C. 1 hr air | 200° C. 1 hr air |
| Oxidized Product | Element Analysis (%) | C | 96.4 | 96.4 | 82.5 | 95.4 | 96 |
| | | H | 3.5 | 3.5 | 2.2 | 3.5 | 3.4 |
| | | N | 0.1 | 0.1 | 0 | 0.1 | 0.1 |
| | | O | 0 | 0 | 14.9 | 1 | 0.5 |
| Mixing | Activator | | KOH | KOH | KOH | KOH | KOH |
| | Activator/Carbon Material Mix Ratio (g/g) | | 2 | 1.4 | 0.7 | 2 | 2 |
| | Activation Temperature (° C.) | | 750 | 750 | 750 | 750 | 700 |
| Activated Carbon | Specific Surfacer Area (m²/g) | | 2013 | 768 | 569 | 2062 | 1756 |
| | Pore Volume (cm³/g) | | 0.954 | 0.363 | 0.267 | 0.981 | 0.827 |

TABLE 2

| Items | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|
| Electrode Density (g/cc) | 0.496 | 0.63 | 0.648 | 0.48 | 0.472 | 0.615 | 0.533 | 0.741 | 0.774 | 0.533 | 0.554 |
| Capacitance Per Unit Mass (F/g) | 47.1 | 45.1 | 43.2 | 48.2 | 49.3 | 44.8 | 43.1 | 36.9 | 37.1 | 43.3 | 42.2 |
| Capacitance Per Unit Volume (F/cc) | 23.4 | 28.4 | 28 | 23.1 | 23.3 | 27.6 | 23 | 27.3 | 28.7 | 23.1 | 23.4 |
| Internal Resistance (Ω) | 2.2 | 2.8 | 2.8 | 2.2 | 2.3 | 2.7 | 2.6 | 12 | 10 | 2.7 | 2.7 |
| Rate Factor*) (%) | 63 | 60 | 62 | 63 | 65 | 62 | 61 | 52 | 53 | 61 | 61 |

*)Maintenance rate of capacitance at constant current discharge (72 mA/cm²) on the basis of the capacitance at a constant discharge (0.36 mA/cm2)

APPLICABILITY IN THE INDUSTRY

The present invention can promote extremely efficiently the reaction of a carbon material and an alkali activator, the amount of which is less than ever before and thus can produce an activated carbon that is low in production cost, excellent in uniformity and large in capacitance per unit volume. The present invention is, therefore, significantly large in industrial value.

The invention claimed is:

1. A method for producing an activated carbon for an electric double layer capacitor electrode comprising:
   adjusting a green coke produced by delayed coking as it is or after having been calcined to produce a carbon powder having an average particle diameter of 0.5 to 15 μm;
   oxidizing the carbon powder to contain 3 percent by mass or more and 15 percent by mass or less of oxygen; and
   activating the oxidized product with an alkali activator.

2. The method for producing an activated carbon according to claim 1 wherein the carbon material is graphitizable.

3. The method for producing an activated carbon according to claim 1 wherein the calcination temperature is from 500 to 900° C.

4. The method for producing an activated carbon according to claim 1 wherein the mix ratio of the oxidized product and the alkali activator is in the range of the oxidized product: the alkali activator=1:1 to 1:4 (mass ratio).

* * * * *